(12) United States Patent
Sawant et al.

(10) Patent No.: US 11,267,404 B2
(45) Date of Patent: Mar. 8, 2022

(54) STORAGE DEVICE FOR A VEHICLE CAB

(71) Applicant: Volvo Truck Corporation, Gothenburg (SE)

(72) Inventors: Harshad Sawant, Bangalore (IN); Aditya Hande, Bangalore (IN)

(73) Assignee: Volvo Truck Corporation, Gothenburg (SE)

(*) Notice: Subject to any disclaimer, the term of this patent is extended or adjusted under 35 U.S.C. 154(b) by 81 days.

(21) Appl. No.: 16/868,182

(22) Filed: May 6, 2020

(65) Prior Publication Data

US 2020/0353869 A1 Nov. 12, 2020

(30) Foreign Application Priority Data

May 7, 2019 (IN) .............................. 201941018287

(51) Int. Cl.
*B60R 5/00* (2006.01)
*B60R 11/00* (2006.01)

(52) U.S. Cl.
CPC ......... *B60R 5/00* (2013.01); *B60R 2011/0003* (2013.01); *B60R 2011/0043* (2013.01); *B60R 2011/0075* (2013.01); *B60R 2011/0084* (2013.01)

(58) Field of Classification Search
CPC ................ B60J 5/00; B60R 2011/0003; B60R 2011/0043; B60R 2011/0075; B60R 2011/0074
USPC ......................................................... 296/37.1
See application file for complete search history.

(56) References Cited

U.S. PATENT DOCUMENTS

| 1,819,516 | A | * | 8/1931 | Kelly | ........................ B60R 7/04 |
| | | | | | 296/37.7 |
| 1,893,624 | A | * | 1/1933 | Webb | ...................... A24F 15/00 |
| | | | | | 224/281 |
| 3,494,656 | A | | 2/1970 | McIntire | |
| 3,758,147 | A | | 9/1973 | Burton | |
| 4,669,773 | A | | 6/1987 | LeVee | |
| RE33,112 | E | * | 11/1989 | Durham | .................. B60R 11/02 |
| | | | | | 296/37.7 |
| 6,851,376 | B2 | * | 2/2005 | D'Agostino | ........... A47B 51/00 |
| | | | | | 108/147 |

(Continued)

FOREIGN PATENT DOCUMENTS

| CN | 208216613 U | | 12/2018 |
| CN | 109455131 A | * | 3/2019 |
| DE | 102014014817 A1 | | 4/2016 |

OTHER PUBLICATIONS

Notice of Allowance for U.S. Appl. No. 16/868,203, dated Sep. 27, 2021, 8 pages.

*Primary Examiner* — Hilary L Gutman
(74) *Attorney, Agent, or Firm* — Withrow & Terranova, PLLC

(57) ABSTRACT

A storage device for a vehicle cab, said storage device comprising: a vertically moveable storage unit onto or into which items are intended to be stored, a support structure configured to support the storage unit and to allow vertical movement of the storage unit between a first/upper position and a second/lower position when the storage device is mounted to a wall or similar, wherein the support structure comprises a first spring member arranged to dampen downwards movement and assist upwards movement of the storage unit.

15 Claims, 10 Drawing Sheets

(56) References Cited

U.S. PATENT DOCUMENTS

| | | | | |
|---|---|---|---|---|
| 8,393,665 | B2* | 3/2013 | Villano | B60R 11/06 296/37.6 |
| 8,991,951 | B2* | 3/2015 | Lee | F16M 11/24 312/319.5 |
| 2008/0164708 | A1* | 7/2008 | Hirsch | B60R 7/02 296/37.1 |
| 2020/0353870 | A1* | 11/2020 | Sawant | B60R 7/04 |

* cited by examiner

STORAGE DEVICE FOR A VEHICLE CAB

RELATED APPLICATIONS

This application claims priority to Indian patent application number 201941018287, filed May 7, 2019, the disclosure of which is hereby incorporated herein by reference in its entirety.

FIELD OF THE DISCLOSURE

The present disclosure relates to a storage device for a vehicle cab, in particular a storage device for a rear upper storage in a high roof sleepers cab of a truck. The present disclosure also relates to a vehicle provided with such a storage device.

BACKGROUND

Sleeper cabs for trucks are often provided with storage bins arranged high up on a wall close to the ceiling inside the truck cab. In high roof cabs, and in particular for short drivers/users, the accessibility to such storage bins is poor. As a result these storage bins are not frequently used and the space utilization is not efficient.

An example of a vertically adjustable push-pull luggage rack for a passenger car is disclosed in CN208216613, which is incorporated herein by reference in its entirety. The proposed arrangement includes a set of vertically arranged tension gas springs that provides for simplified vertical adjustment of a plate onto which luggage can be placed. Although the solution of CN208216613 might be useful in passenger cars it is not very helpful for storage bins in a high roof truck cab since the vertical distance between the upper and lower positions is not sufficient; it would still be difficult to reach the storage bin even when lowered to its lower position. To simply use longer gas springs would not solve the problem since it then would not be possible to lift the storage bin all the way up close to the ceiling.

There is thus a need for improvements in this field.

SUMMARY

An object of the present disclosure is to provide a storage device for a vehicle cab, in particular a storage device for a rear upper storage in a high roof sleepers cab of a truck, that is easy to use and improves accessibility. Another object is to provide a vehicle cab provided with such a storing device.

The present disclosure concerns a storage device for a vehicle cab, said storage device comprising: a vertically moveable storage unit onto or into which items are intended to be stored; and a support structure configured to support the storage unit and to allow vertical movement of the storage unit between a first/upper position and a second/lower position when the storage device is mounted to a wall or similar, wherein the support structure comprises a first spring member arranged to dampen downwards movement and assist upwards movement of the storage unit.

The storage device is characterized in that the support structure comprises a telescopic guide rail comprising a stationary upper rail member, a vertically movable intermediate rail member slidably connected to the upper rail member and a vertically movable lower rail member slidably connected to the intermediate rail member and fixedly connected to the storage unit. The telescopic guide rail is arranged to be extended and retracted by means of the moveable rail members when the storage unit is moved between the first/upper and second/lower positions. The first spring member is arranged substantially vertically with an upper end portion fixed in relation to the upper rail member and a lower end portion fixedly connected to the intermediate rail member. The storage device further comprises a second spring member arranged substantially vertically with an upper end portion fixedly connected to the intermediate rail member and a lower end portion fixedly connected to the lower rail member and/or the storage unit.

Such a telescopic design provides for a large distance between upper and lower position of the storage unit and is therefore suitable for being arranged close to a ceiling in a vehicle cab with large height between floor and ceiling (while the push-pull luggage rack of CN208216613U is not). The telescopic design also provides for a compact device when arranged in the upper, retracted position.

Further, the use of two spring members arranged in series provides for effective dampening throughout the entire lowering of the storage unit from the upper to the lower position and also provides effective assistance to the user when the storage unit is moved/pushed vertically upwards into the retracted upper position.

The telescopic guide rail may comprise one or more additional intermediate rail members in which case the intermediate rail member defined is indirectly connected to the upper and/or the lower rail members.

In an embodiment the first spring member is configured to be lockable in at least an extended state. This facilitates holding the storage unit stationary in the lower position.

In an embodiment the first spring member is provided with a first plunger member arranged to, when pressed upon, unlock the first spring member when locked in the extended state. The first plunger member is preferably arranged at a lower end of the first spring member so as to allow unlocking by pressing upwards upon the first plunger member.

In an embodiment a first plunger actuator is fixed directly or indirectly to the lower rail member, wherein the first plunger actuator is positioned in relation to the first plunger member in such a way that the plunger actuator presses onto the first plunger member when the lower rail member is moved upwards while the first spring member is locked in its extended state and the intermediate rail member is stationary. That is, at some point during movement of the storage unit from the lower position towards the upper position when only the lower rail moves and the second spring member retracts (because the intermediate rail member is locked by the locked first spring member), the plunger actuator presses onto the plunger member (which may be difficult to reach from the floor of the vehicle cab) and unlocks the first spring member so that the storage unit can retract fully into (up to) its first, upper position. The relative position of the actuator and plunger may be such that the plunger is pressed upon only when the second spring member is almost entirely retracted so that only one spring member at a time assists in the upwards movement of the storage unit.

In an embodiment the second spring member is configured to be lockable in at least an extended state. Again, this facilitates holding the storage unit stationary in the lower position. If both spring members can be locked in the extended state the storage unit can safely be kept in the lower position.

In an embodiment the second spring member is provided with a second plunger member arranged to, when pressed upon, unlock the second spring member when locked in the extended state. The second plunger member is preferably arranged at a lower end portion of the spring member to make it easier to reach for a person standing on a floor below the storage device.

In an embodiment a manually maneuverable second plunger actuator is connected to the second plunger member. The second plunger actuator may be switch/push button connected to the second plunger member by means of a cable/wire. Such a cable/wire may simple hang down and make it even easier to unlock the second plunger member (since the manually maneuverable second plunger actuator will be positioned closer to the floor if arranged in the lower end of the cable/wire).

In an embodiment each of the spring members is a tensile spring member configured to exert a pulling force when extended. Preferably, each of the spring members is a gas spring.

In an embodiment the storage device comprises a first and a second telescopic guide rail with spring members according to above, wherein the first and second telescopic guide rails are arranged on opposite sides of the storage device. Typically, the device has a backside facing a wall and front side facing outwards, and preferably the first and second telescopic guide rails are arranged on left and right sides connecting the back and front sides. This makes the device symmetric and steady.

In an embodiment the storage device comprises a supporting member that extends laterally around a backside of the storage device and that is connected to the upper rail member of both the first and the second telescopic guide rails. This provides for a steady support. This supporting member may in turn be slidably connected to a guiding rail that preferably is mounted to a supporting wall.

In an embodiment the storage device comprises an upper supporting bracket connected to the upper rail member. The supporting bracket is typically mounted directly or indirectly to a supporting wall. The storage device may comprise several supporting brackets.

In an embodiment the storage device is arranged so that the storage unit as a whole moves in a vertical direction when the storage unit moves between the first and second positions. Thus, the storage unit does not pivot around an axis but is capable of moving as a whole upwards and downwards, preferably along a guiding rail.

The present disclosure also concerns a vehicle provided with a vehicle cab, wherein the vehicle cab is provided with a storage device according to above. In an embodiment the storage device is arranged onto a wall inside the vehicle cab.

Further advantages and advantageous features of the present disclosure are disclosed in the following description and in the dependent claims.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
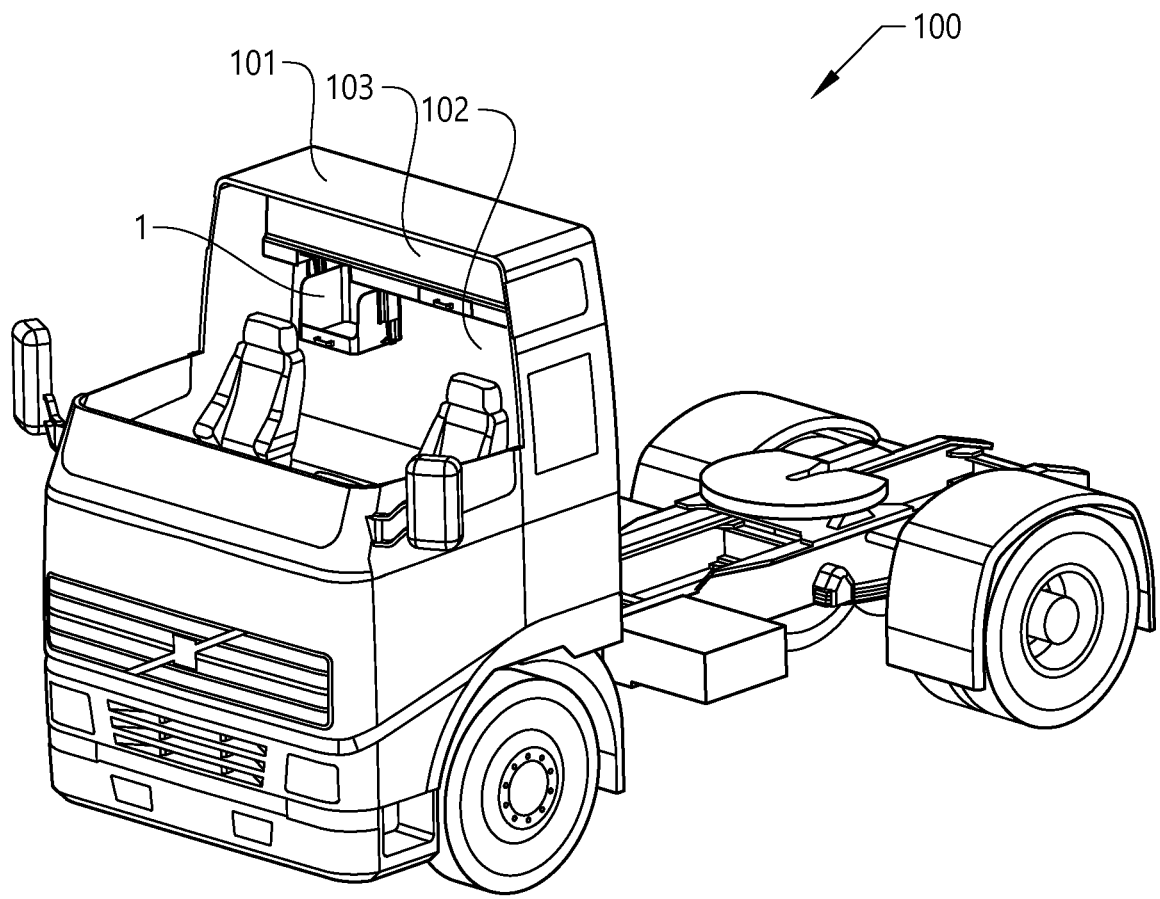
FIG. 1 shows a truck with a sleepers cab provided with a rear upper storage comprising a storage device according to an embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 shows a truck 100 with a sleepers cab 101 provided with a rear upper storage 103 comprising a storage device 1 according to an embodiment of the present disclosure. The rear upper storage 103 and the storage device 1 are mounted onto a wall 102 inside the cab 101. An upper front portion of the cab 101 has been removed in FIG. 1 to better show the inside (i.e. the upper part of the windshield and the front portion of the roof are not shown in FIG. 1).

Figure 2:
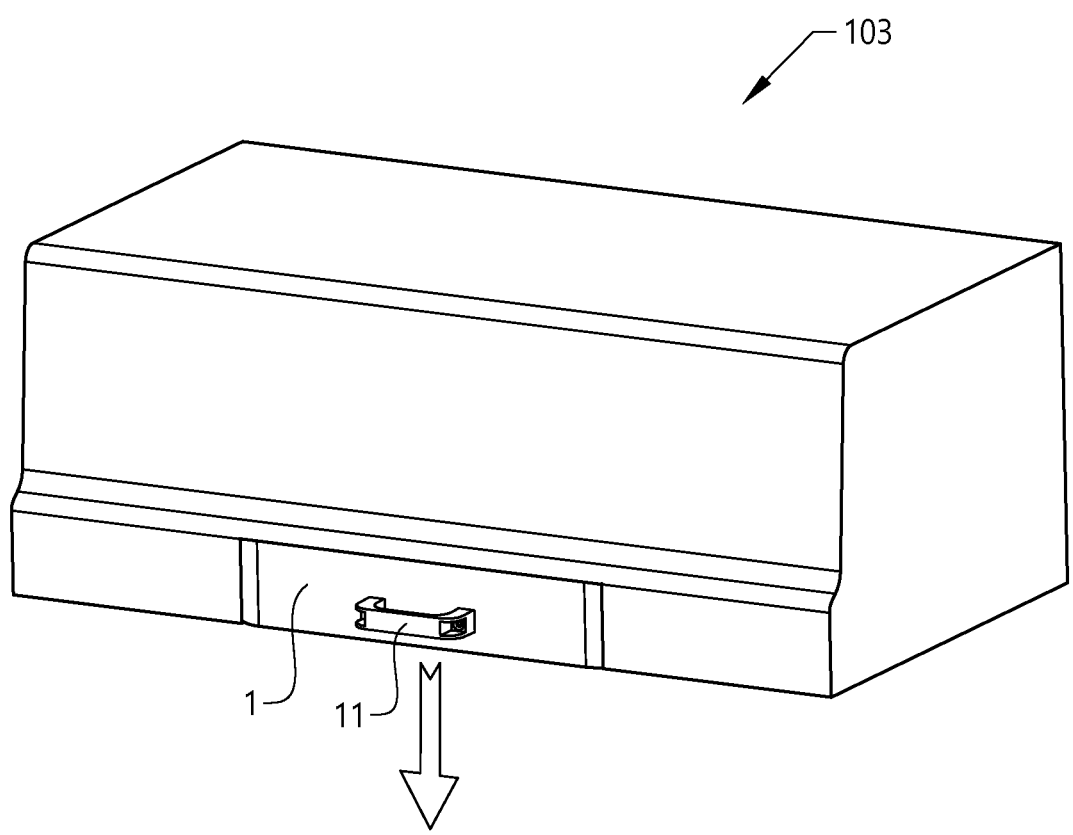
FIG. 2 shows the rear upper storage according to FIG. 1 with the storage device in an upper, retracted position.
Figure 3:
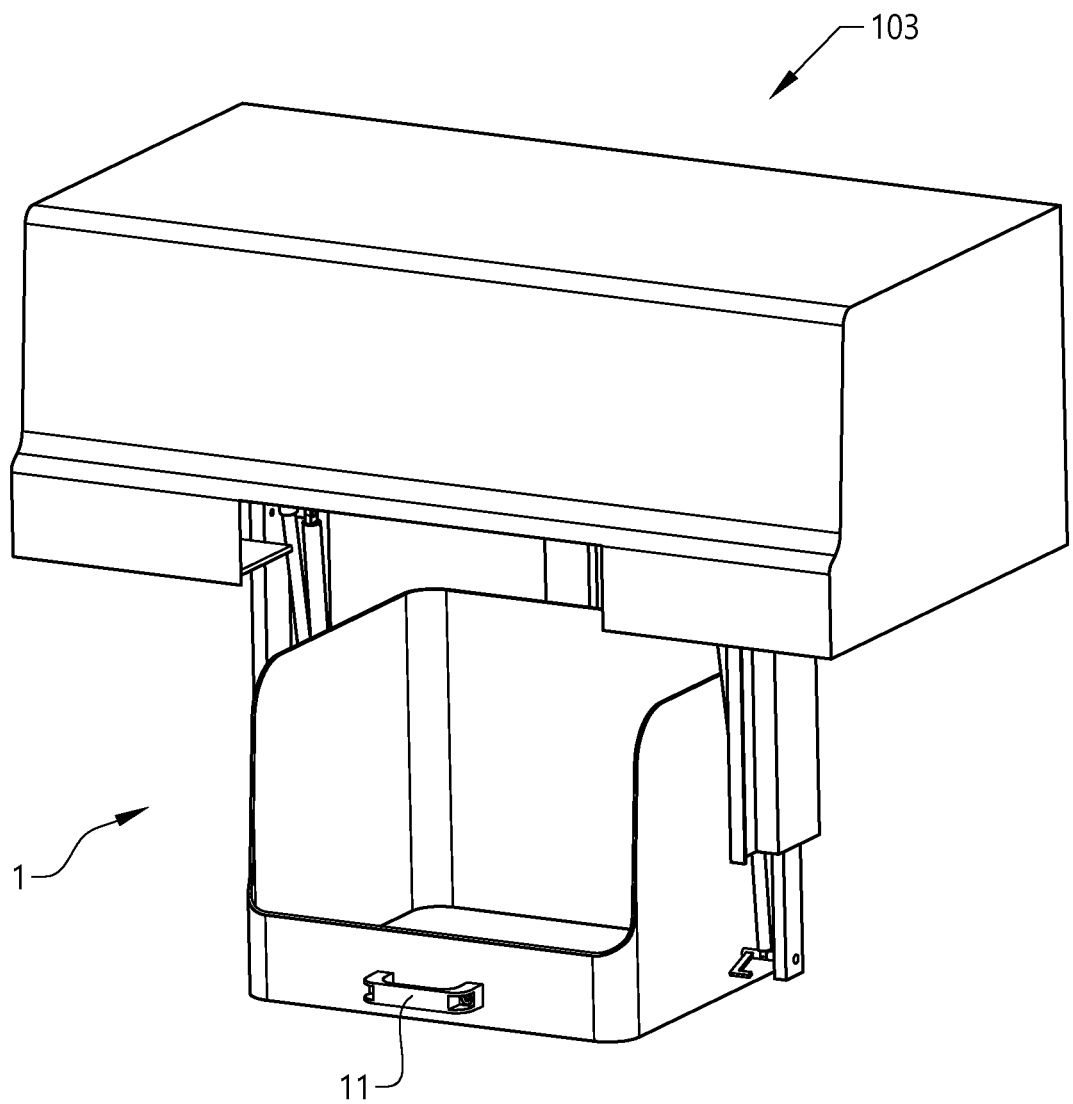
FIG. 3 shows the rear upper storage according to FIG. 1 with the storage device in a lower, extended position.
Figure 4:
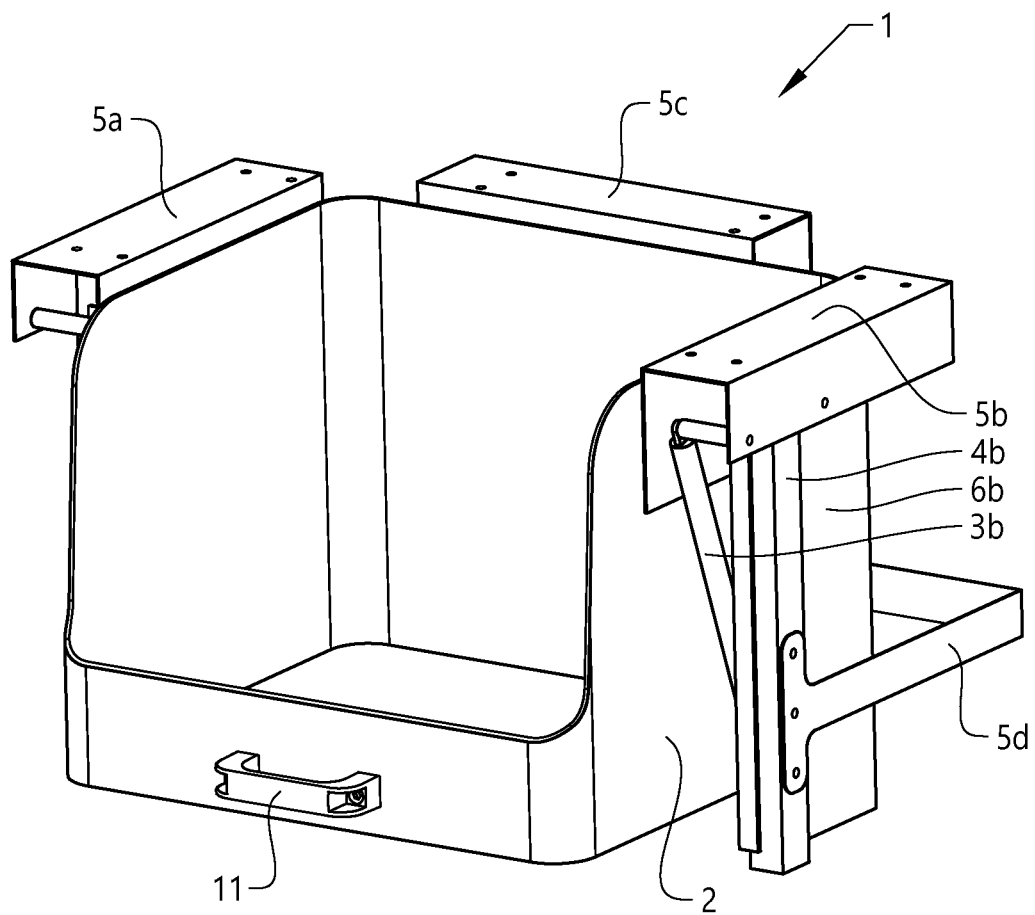
FIG. 4 shows the storage device in an upper, retracted position (same as FIG. 2 but without surrounding rear upper storage).

FIG. 2 shows the rear upper storage 103 according to FIG. 1 with the storage device 1 arranged in an upper, retracted position. FIG. 2 also shows that the storage device 1 is provided with a handle 11. FIG. 3 shows the rear upper storage 103 according to FIG. 1 with the storage device 1 arranged in a lower, extended position.

As shown in FIGS. 4-10, the storage device 1 comprises a vertically moveable storage unit 2 onto or into which items are intended to be stored and a support structure configured to support the storage unit 2 and to allow vertical movement of the storage unit 2 between the first/upper position and the second/lower position when the storage device 1 is mounted to the wall 102.

The support structure comprises, among other components, first and second spring members 3a, 3b, 8a, 8b arranged to dampen downwards movement and assist upwards movement of the storage unit 2. The support structure also comprises first and second telescopic guide rails. In the example described here the storage device 1 is provided with two similar (mirror inverted) spring member-telescopic guide rail arrangements arranged on opposite (left and right) sides of the storage device 1. What is explained below for one of the sides is valid also for the other side.

Each telescopic guide rail comprises a stationary upper rail member 4a, 4b, a vertically movable intermediate rail member 6a, 6b slidably connected to the upper rail member 4a, 4b and a vertically movable lower rail member 7a, 7b slidably connected to the intermediate rail member 6a, 6b and fixedly connected to the storage unit 2. Each telescopic guide rail is arranged to be extended and retracted by means of the moveable rail members 6a, 6b, 7a, 7b when the storage unit 2 is moved between the first/upper and second/lower positions.

Figure 8:
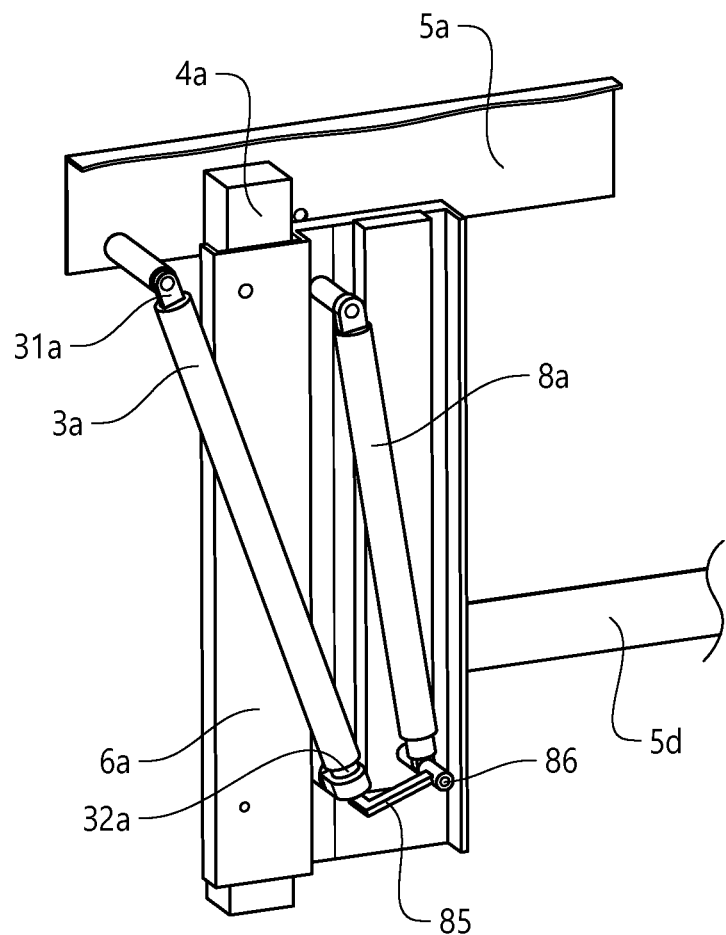
FIG. 8 shows a telescopic guide rail with corresponding spring members in a retracted position.
Figure 9:
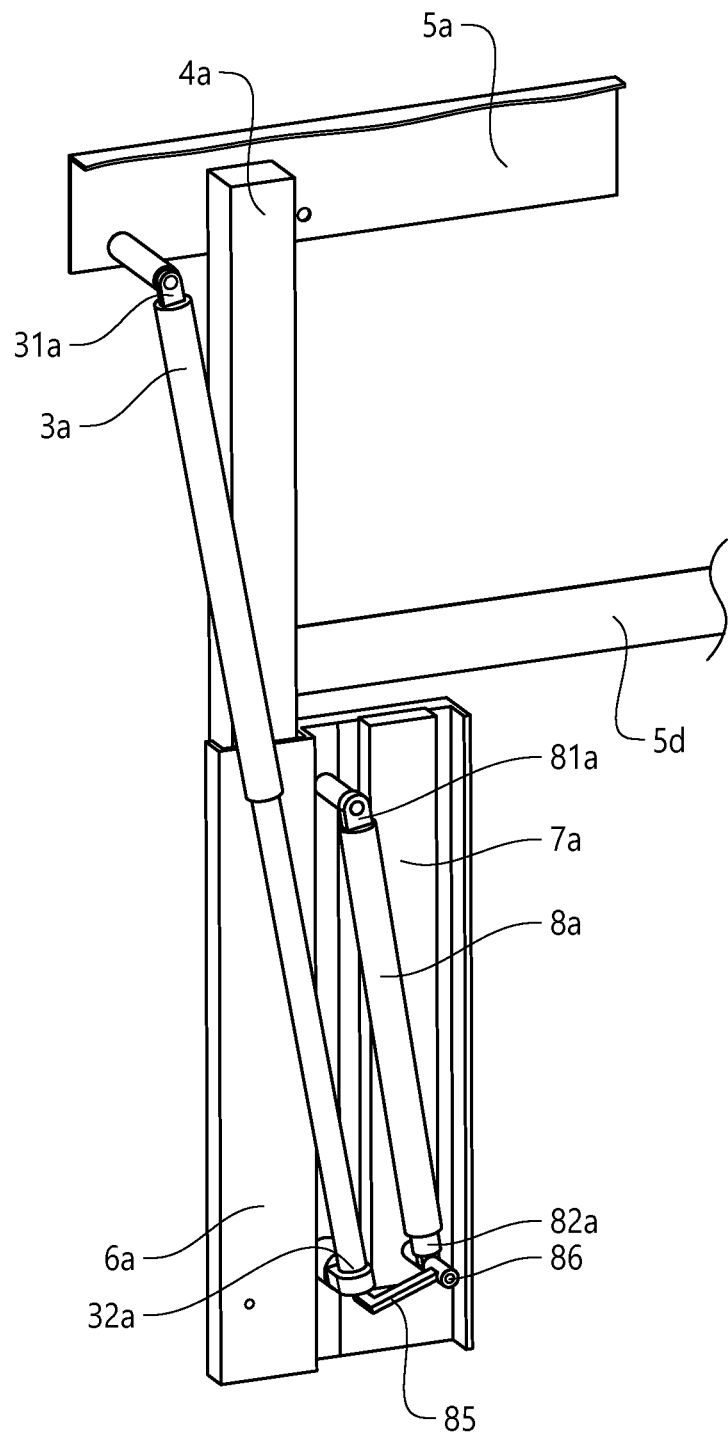
FIG. 9 shows the telescopic guide rail and the corresponding spring members of FIG. 8 in a partly extended position.
Figure 10:
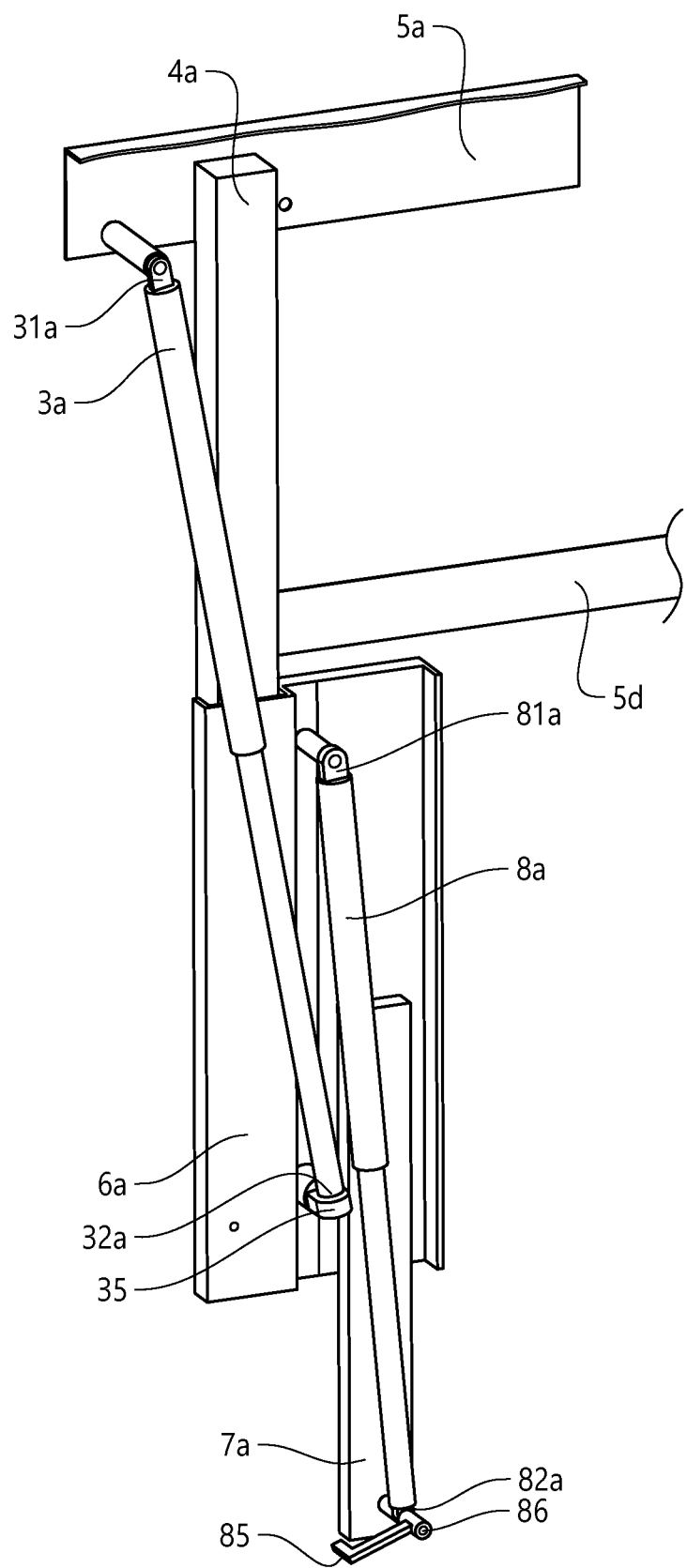
FIG. 10 shows the telescopic guide rail and the corresponding spring members of FIG. 8 in a fully extended position.

Each first spring member 3a, 3b is arranged substantially vertically with an upper end portion 31a, 31b fixed in relation to the upper rail member 4a, 4b and a lower end portion 32a, 32b fixedly connected to the intermediate rail member 6a, 6b (see e.g. FIGS. 8-10). The upper end portion 31a, 32a is indirectly fixed to the upper rail member 4a, 4b via a support bracket 5a, 5b.

Each second spring member 8a, 8b is arranged substantially vertically with an upper end portion 81a, 81b fixedly connected to the intermediate rail member 6a, 6b and a lower end portion 82a, 82b fixedly connected to the lower rail member 7a, 7b (and also to the storage unit 2). This is shown in FIG. 10.

Each first spring member 3a, 3b is configured to be lockable in its extended state, i.e. in the state shown in e.g. FIGS. 9 and 10, and is provided with a first plunger member 35 (see FIG. 10) arranged to, when pressed upon, unlock the first spring member 3a, 3b when locked in the extended state. The first plunger member 35 is located on the underside of the lower end portion 32a and is not clearly visible in FIG. 10.

A first plunger actuator 85 (see e.g. FIGS. 6 and 10) is fixed to the lower rail member 7a, 7b close to the lower end portion 82a of the second spring member 8a. The first plunger actuator 85 is positioned in relation to the first plunger member 35 in such a way that the first plunger actuator 85 presses onto the first plunger member 35 when the lower rail member 7a, 7b is moved upwards while the first spring member 3a, 3b is locked in its extended state and the intermediate rail member 6a, 6b is stationary. This can be understood from FIGS. 10 and 9: In FIG. 10 the telescopic guide rail as well as both the first and the second spring members 3a, 8a are fully extended, which corresponds to the situation where the storage unit 2 is in its second/lower position. In FIG. 9 the lower rail member 7a and the second spring member 8a are retracted (because the storage unit 2 has been lifted some distance from its lower position shown in FIG. 10) while the intermediate rail member 6a is still in its lower position and the (locked) first spring member 3a is still extended. When the first plunger actuator 85 reaches the first plunger member 35 and pushes thereupon, i.e. in the position shown in FIG. 9, the first spring member 3a unlocks and the telescopic guide rail and the first spring member 3a can be fully retracted as shown in FIG. 8, which corresponds to the situation where the storage unit 2 is in its first/upper position.

Also each second spring member 8a, 8b is configured to be lockable in its extended state and is provided with a second plunger member 86 (see e.g. FIG. 8) arranged to, when pressed upon, unlock the second spring member 8a, 8b when locked in the extended state. A manually maneuverable second plunger actuator (not shown) may be connected to the second plunger member.

Each of the spring members 3a, 3b, 8a, 8b is in this example a tensile gas spring member configured to exert a pulling force when extended.

As mentioned above the storage device 1 comprises a first and a second telescopic guide rail with corresponding spring members arranged on opposite (left and right) sides of the storage device 1. The storage device 1 further comprises a supporting member 5d (see e.g. FIG. 6) that extends laterally around a backside of the storage device 1 and that is connected to the upper rail member 4a, 4b of both the first and the second telescopic guide rails.

Figure 6:
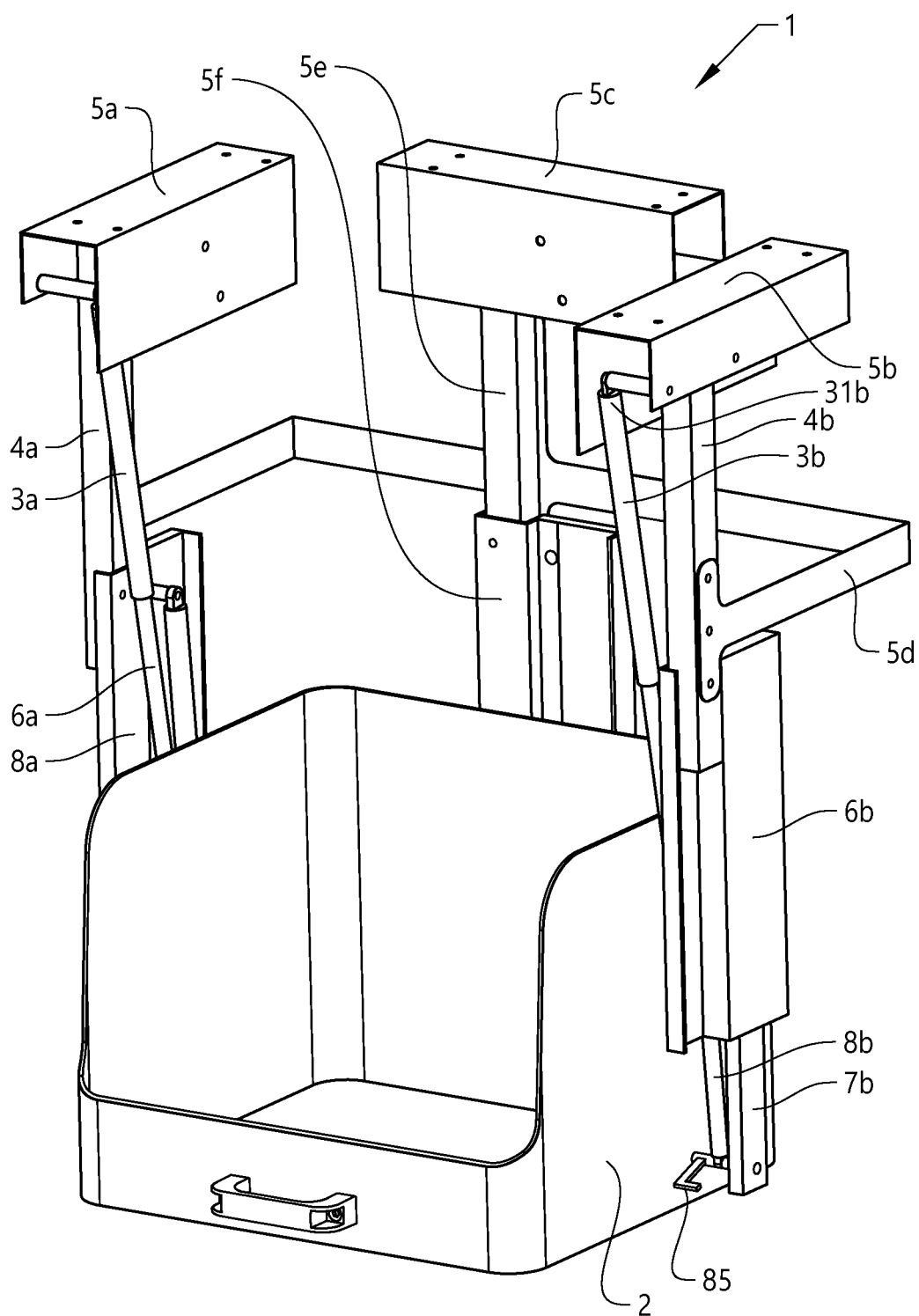
FIG. 6 shows the storage device in a lower, extended position (same as FIG. 3 but without surrounding rear upper storage).
Figure 7:
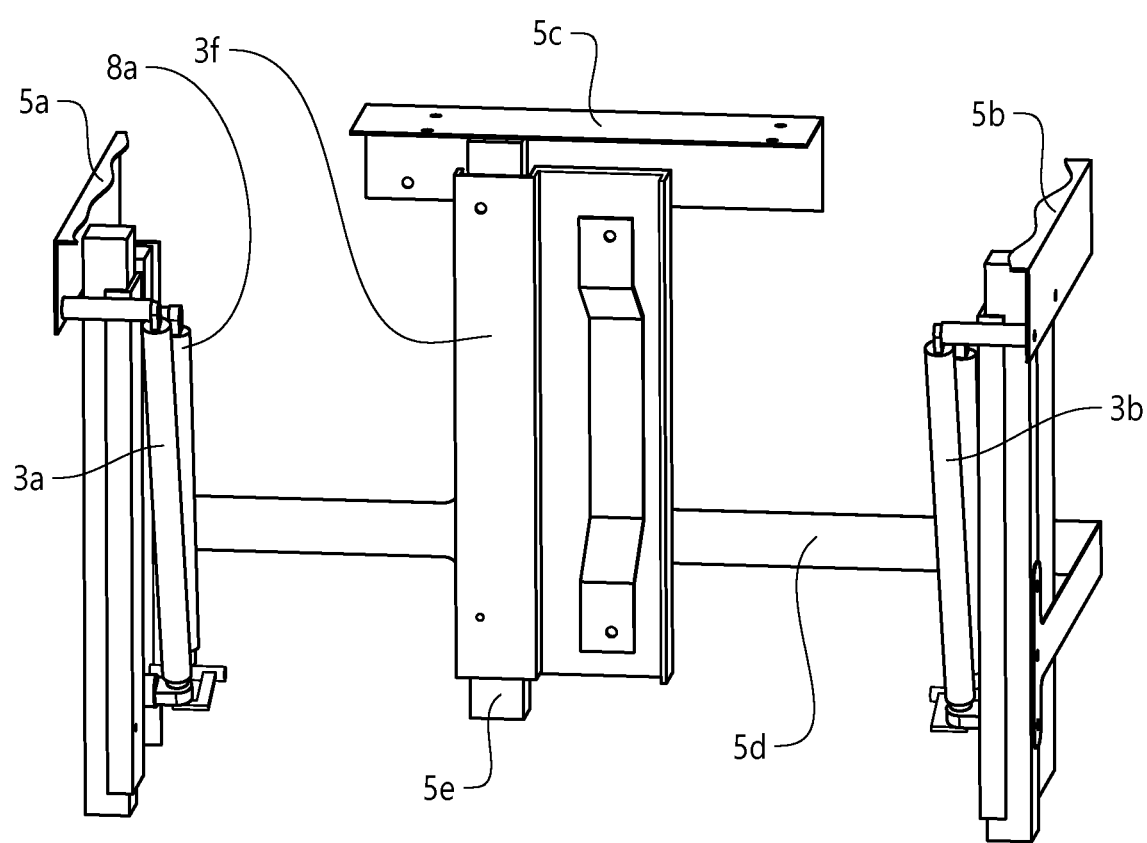
FIG. 7 shows a support structure of the storage device (without storage unit).

The storage device 1 further comprises upper supporting brackets 5a, 5b connected to corresponding upper rail member 4a, 4b and a further supporting bracket 5c connected to a guide rail 5e, see FIGS. 6-7. A support plate 5f is slidably connected to the guide rail 5e and fixed to a backside of the storage unit 2 so as to hold the storage unit 2 steady while moving between its upper and lower positions.

Figure 5:
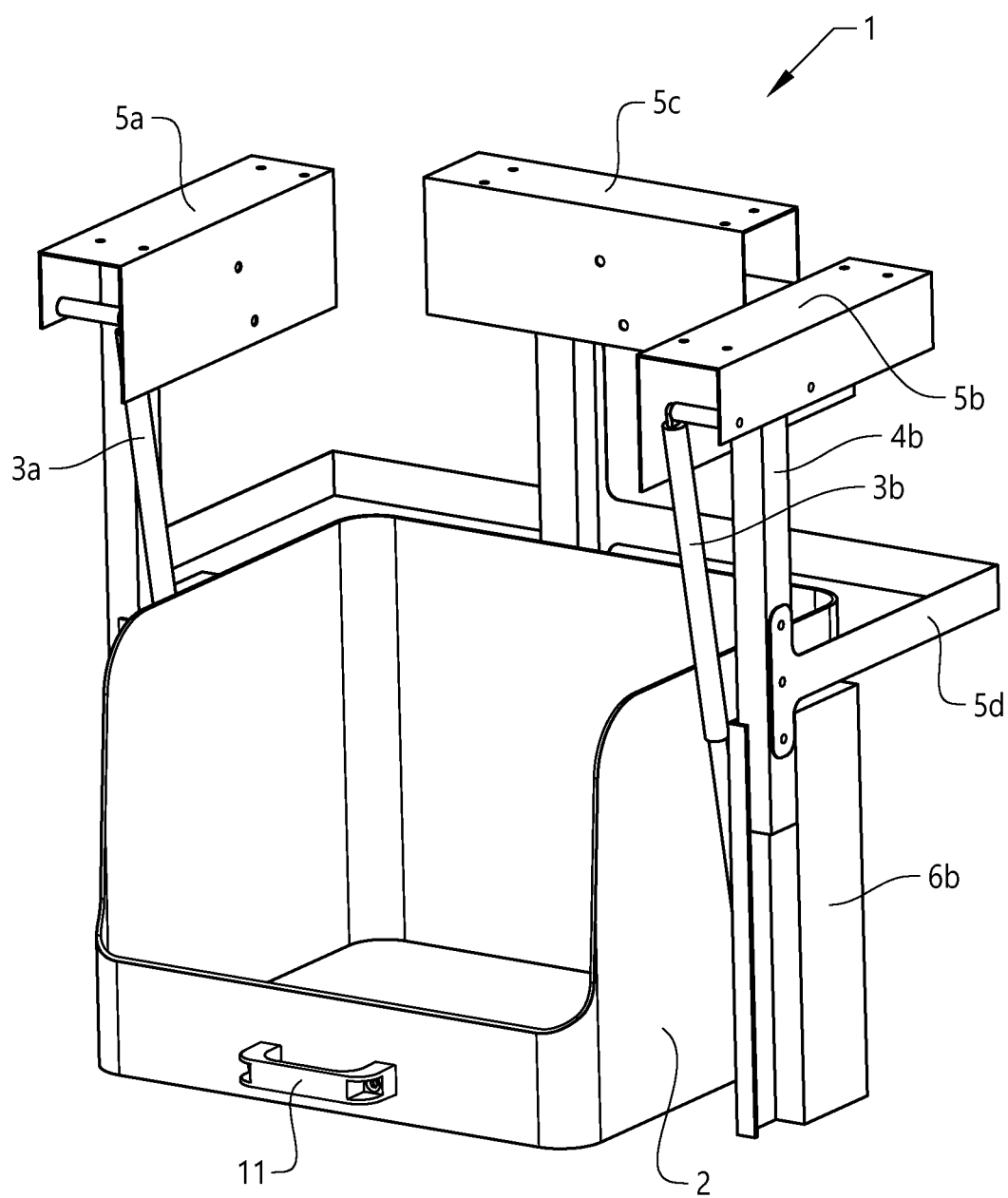
FIG. 5 shows the storage device of FIG. 4 in a partly extended position.

The function of the storage device 1 is as follows: When the storage device 1 is not in use the storage unit 2 is typically placed in its first/upper position as shown or indicated in FIGS. 2, 4, 7 and 8. Additional components (not shown) may be used to secure the storage unit 2 in the upper position. When the handle 11 is gripped and the storage unit 2 is pulled downwards the first spring members 3a, 3b (on each side of the device) extend and the intermediate rail members 6a, 6b slide downwards along the corresponding upper rail members 4a, 4b. When the first spring members 3a, 3b and the intermediate rail members 6a, 6b are fully extended but the second spring members 8a, 8b and the lower rail members 7a, 7b are still retracted, as shown in FIGS. 5 and 9, the first spring members 3a, 3b lock. Pulling the storage unit 2 further downwards leads to extension of the second spring members 8a, 8b and sliding downwards of the lower rail members 7a, 7b until full extension where the second spring members 8a, 8b lock and the storage unit 2 reaches its second/lower position as shown in FIGS. 3, 6 and 10.

To move the storage unit 2 back up to its upper position the second spring members 8a, 8b are unlocked (by pressing the corresponding second plunger member 86), the storage unit 2 is pushed upwards (or possibly the storage unit 2 moves upwards slowly by the force of the spring members if it is empty and light) while the second spring members 8a, 8b retract and the lower rail members 7a, 7b retract into the corresponding intermediate rail members 6a, 6b. When the first plunger actuator 85 reaches and presses onto the corresponding first plunger member 35 (see FIG. 9) the first spring members 3a, 3b unlock and the storage unit 2 can continue to move up to the first/upper position where it may be secured.

As clearly described above and shown in the figures, the storage device 1 is arranged so that the storage unit 2 as a whole moves in a vertical direction when the storage unit moves between the first and second positions.

Those skilled in the art will recognize improvements and modifications to the preferred embodiments of the present disclosure. All such improvements and modifications are considered within the scope of the concepts disclosed herein and the claims that follow.

What is claimed is:

1. A storage device for a vehicle cab, the storage device comprising:
   a vertically moveable storage unit onto or into which items are intended to be stored; and
   a support structure configured to support the storage unit and to allow vertical movement of the storage unit between a first position and a second position when the storage device is mounted to a wall, the support structure comprising:
      a first spring member arranged to dampen downwards movement and assist upwards movement of the storage unit, and
      a telescopic guide rail comprising:
         a stationary upper rail member,
         a vertically moveable intermediate rail member slidably connected to the upper rail member, and
         a vertically moveable lower rail member slidably connected to the intermediate rail member and fixedly connected to the storage unit,
   wherein the telescopic guide rail is arranged to be extended and retracted by the moveable rail members when the storage unit is moved between the first and second positions,
   wherein the first spring member is arranged substantially vertically with an upper end portion fixed in relation to the upper rail member and a lower end portion fixedly connected to the intermediate rail member, and
   wherein the storage device further comprises a second spring member arranged substantially vertically with an upper end portion fixedly connected to the intermediate rail member and a lower end portion fixedly connected to the lower rail member and/or the storage unit.

2. The storage device of claim 1, wherein the first spring member is configured to be lockable in at least an extended state.

3. The storage device of claim 2, wherein the first spring member is provided with a first plunger member arranged to, when pressed upon, unlock the first spring member when locked in the extended state.

4. The storage device of claim 3, wherein a first plunger actuator is fixed to the lower rail member, and wherein the first plunger actuator is positioned in relation to the first plunger member in such a way that the first plunger actuator presses onto the first plunger member when the lower rail member is moved upwards while the first spring member is locked in its extended state and the intermediate rail member is stationary.

5. The storage device of claim 1, wherein the second spring member is configured to be lockable in at least an extended state.

6. The storage device of claim 5, wherein the second spring member is provided with a second plunger member arranged to, when pressed upon, unlock the second spring member when locked in the extended state.

7. The storage device of claim 6, wherein a manually maneuverable second plunger actuator is connected to the second plunger member.

8. The storage device of claim 1, wherein each of the spring members is a tensile spring member configured to exert a pulling force when extended.

9. The storage device of claim 1, wherein each of the spring members is a gas spring.

10. The storage device of claim 1, wherein the storage device comprises a first and a second telescopic guide rail with spring members, wherein the first and second telescopic guide rails are arranged on opposite sides of the storage device.

11. The storage device of claim 10, wherein the storage device comprises a supporting member that extends laterally around a backside of the storage device and that is connected to the upper rail member of both the first and the second telescopic guide rails.

12. The storage device of claim 1, wherein the storage device comprises an upper supporting bracket connected to the upper rail member.

13. The storage device of claim 1, wherein the storage device is arranged so that the storage unit as a whole moves in a vertical direction when the storage unit moves between the first and second positions.

14. A vehicle provided with a vehicle cab, wherein the vehicle cab is provided with a storage device, the storage device comprising:
   a vertically moveable storage unit onto or into which items are intended to be stored; and a support structure configured to support the storage unit and to allow vertical movement of the storage unit between a first position and a second position when the storage device is mounted to a wall, the support structure comprising:
- a first spring member arranged to dampen downwards movement and assist upwards movement of the storage unit, and
- a telescopic guide rail comprising:
  - a stationary upper rail member,
  - a vertically moveable intermediate rail member slidably connected to the upper rail member, and
  - a vertically moveable lower rail member slidably connected to the intermediate rail member and fixedly connected to the storage unit,
  - wherein the telescopic guide rail is arranged to be extended and retracted by the moveable rail members when the storage unit is moved between the first and second positions,
- wherein the first spring member is arranged substantially vertically with an upper end portion fixed in relation to the upper rail member and a lower end portion fixedly connected to the intermediate rail member, and wherein the storage device further comprises a second spring member arranged substantially vertically with an upper end portion fixedly connected to the intermediate rail member and a lower end portion fixedly connected to the lower rail member and/or the storage unit.

15. The vehicle of claim 14, wherein the storage device is arranged onto a wall inside the vehicle cab.

* * * * *